Oct. 11, 1955 WILLIAM I. L. WU 2,720,587
ELECTRONIC SWITCHING DETECTION SYSTEM
Filed Aug. 14, 1944
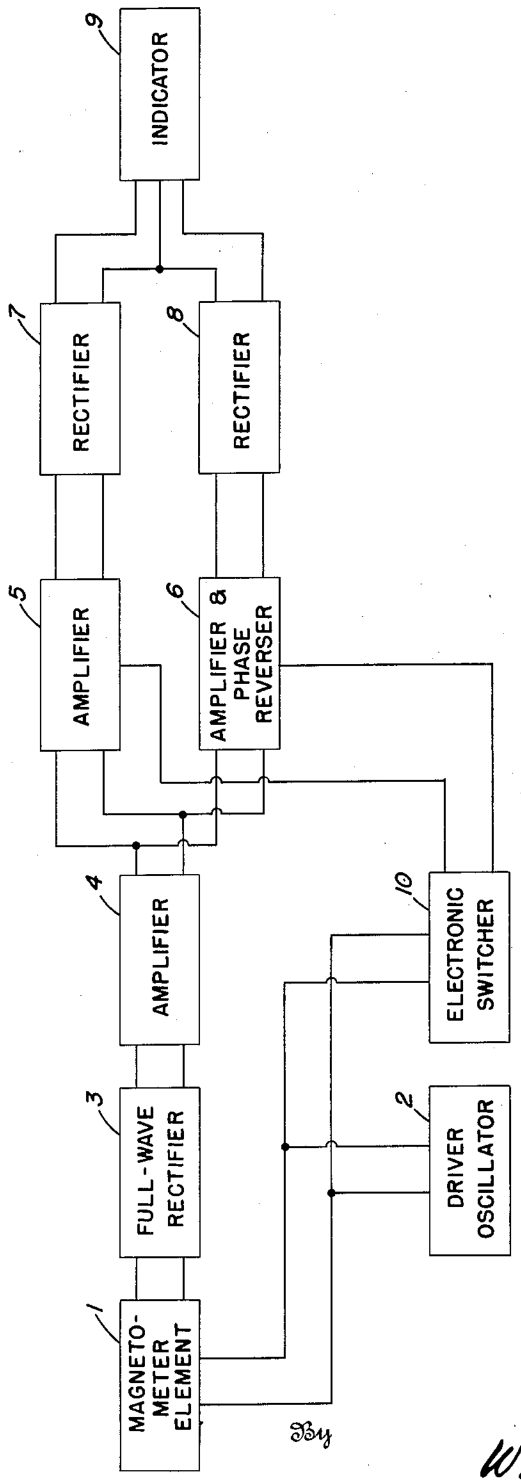
Inventor
WILLIAM I. L. WU
By
Walter S. Paul
Attorney United States Patent Office 2,720,587

Patented Oct. 11, 1955

2,720,587

ELECTRONIC SWITCHING DETECTION SYSTEM

William I. L. Wu, New York, N. Y., assignor to the United States of America as represented by the Secretary of the Navy Application August 14, 1944, Serial No. 549,435

6 Claims. (Cl. 250—27)

This invention relates to an improved detection system, and more particularly to a method of and means for converting an input signal comprising a series of pulses of alternate polarity and varying amplitude into an output signal whose magnitude is substantially proportional to the difference in amplitude of the alternate input-signal pulses.

The detection system of the present invention is especially adapted for utilizing the pulse output from a saturated-core magnetometer, as for example the unbalanced magnetometer disclosed in copending application Serial No. 516,612, filed January 1, 1944, Patent No. 2,560,132, granted July 10, 1951. The output from such a magnetometer comprises a series of pulses of alternate polarity, information regarding the ambient magnetic field surrounding the magnetometer element being conveyed by the relative changes in heights of these pulses. Since the output from such a magnetometer is at a relatively low level, it is necessary to provide a system for amplifying this output which does not in itself introduce appreciable distortion thereof.

Previously, detectors for this type of pulse output have necessarily been double ended, thus introducing the difficulty inherent in maintaining the gain in a pair of high-gain amplifiers substantially constant in spite of fluctuations in supply voltage and wide variations in the signal strength. At the best, such systems generally required a careful selection of balanced vacuum tubes, and they had the further disadvantage that distortion introduced by a single one of the amplifiers affected only the pulses of a single polarity.

In accordance with the present invention, it is proposed to obviate the difficulties encountered in previous systems by combining pulses of the two polarities and subjecting them to amplification in a single-channel amplifier, and then separating the output of the amplifier into two groups of pulses for comparison to provide the desired output signal.

It is an object of the present invention, therefore, to provide an improved detection system which is especially adapted for, but not limited to, use with saturated-core magnetometers. In the system of the present invention, substantially all of the amplification of the relatively weak magnetometer output signal is accomplished in a single channel.

In one aspect of the present invention, there is provided a method of converting an input signal comprising a first series of pulses of alternate polarity and varying amplitude into an output signal whose magnitude is substantially proportional to the difference in the amplitude of the alternate input-signal pulses. This method comprises the steps of subjecting the input signal to full-wave rectification to provide a second series of pulses of a single polarity, amplifying the second series of pulses, separating and reversing the polarity of alternate pulses of the amplified second series, separately rectifying the reversed pulses and the remaining pulses, and combining the two rectified groups of pulses to produce a difference signal.

The present invention also contemplates the provision of a system for converting an input signal comprising a first series of pulses of alternate polarity and varying amplitude into an output signal whose magnitude is substantially proportional to the difference in amplitude of the alternate input-signal pulses. This system comprises a full-wave rectifier adapted to provide from the first series of pulses a second series of pulses of a single polarity, an amplifier for amplifying the second series of pulses, means for separating and reversing the polarity of alternate pulses of the amplified second series, separate rectifiers for the reversed pulses and the remaining pulses, and means for combining the outputs of the two last-mentioned rectifiers to produce a difference signal.

For a better understanding of the invention, together with other and further objects thereof, reference is made to the following description taken in connection with the accompanying drawing, and its scope will be pointed out in the appended claims.

The single figure of the drawing shows, in block form, a detection system in accordance with the present invention, in combination with additional elements comprising a magnetometer.

Referring now to the drawing, there is shown a magnetometer element 1 which is provided with a suitable driving voltage from driver oscillator 2. The output of magnetometer element 1 is supplied to full-wave rectifier 3 which may, for example, comprise a varistor as its rectifying elements, or which may employe suitable vacuum tubes. The output of rectifier 3 is supplied to amplifier 4, which preferably comprises a plurality of vacuum tubes. The output of amplifier 4 is supplied simultaneously to amplifiers 5 and 6, which preferably each include at least one vacuum tube having a relatively sharp cutoff characteristic as its control-grid voltage is varied, and one of which provides a phase reversal not provided by the other. The outputs from amplifiers 5 and 6 are supplied respectively to rectifiers 7 and 8, which are of any suitable type, as for example those employing diodes. The outputs of rectifiers 7 and 8 are combined and their difference is utilized to actuate indicator 9, which may be any suitable meter or recorder for providing visual or graphical indications.

Driver oscillator 2, in addition to supplying the driving voltage to magnetometer 1, also supplies a voltage to electronic switcher 10. The purpose of the latter unit is to provide control voltages respectively for amplifiers 5 and 6, the electronic switcher being so arranged that these voltages cause amplifiers 5 and 6 alternately to be operative and inoperative in sychronism with the driving voltage produced by driver oscillator 2. The connections are such that amplifier 5 is operative while amplifier 6 is inoperative, and vice versa.

In operation, the output of magnetometer element 1 comprises a series of pulses of alternate polarity having a pulse frequency equal to twice the frequency of the driving voltage supplied by driver oscillator 2. When this series of pulses is subjected to full-wave rectification in unit 3, the pulses of one polarity are inverted, so that the output of unit 3 comprises a series of pulses of a single polarity but having the same pulse frequency. This second series of pulses is amplified to a desired degree by amplifier 4, the amplified output of which is supplied simultaneously to amplifiers 5 and 6.

Due to the action of electronic switcher 10, amplifier 5 passes only alternate pulses of the output from amplifier 4, since it is rendered inoperative for the duration of the remaining pulses. Amplifier 6, however, passes these remaining pulses, and at the same time reverses their polarity. The outputs of units 5 and 6, therefore, comprise two series of pulses of different polarities, each series being substantially proportional in amplitude to the pulses of the corresponding single polarity at the output of magnetometer element 1, but an appreciably larger version thereof due to the action of amplifier 4. When these two series of pulses are subjected to rectification in rectifiers 7 and 8, the outputs of which are combined in such a manner as to provide a difference signal, indicator 9 will provide information regarding the strength and direction of the ambient magnetic field surrounding magnetometer element 1.

It will be apparent from the above description that the largest single source of "detector noise" which was found in previous detection arrangements is substantially eliminated in the system in accordance with the present invention, since there is no pair of high-gain amplifiers to be adjusted and maintained in substantially identical condition.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method of converting an input signal comprising a first series of pulses of alternate polarity and varying amplitude into an output signal whose magnitude is substantially proportional to the difference in amplitude of said alternate input-signal pulses, said method comprising the steps of subjecting said input signal to full-wave rectification to provide a second series of pulses of a single polarity, amplifying said second series of pulses, separating and reversing the polarity of alternate pulses of the amplified second series, separately rectifying said reversed pulses and the remaining pulses, and combining said two rectified groups of pulses to produce a difference signal.

2. A system for converting an input signal comprising a first series of pulses of alternate polarity and varying amplitude into an output signal whose magnitude is substantially proportional to the difference in amplitude of said alternate input-signal pulses, said system comprising a full-wave rectifier adapted to provide from said first series of pulses a second series of pulses of a single polarity, an amplifier for amplifying said second series of pulses, means for separating and reversing the polarity of alternate pulses of the amplified second series, separate rectifiers for said reversed pulses and the remaining pulses, and means for combining the outputs of said separate rectifiers to produce a difference signal.

3. A system according to claim 2 wherein said separating and reversing means comprises an electronic switch.

4. The method of converting an input signal comprising a first series of pulses of alternate polarity and varying amplitude into an output signal whose magnitude is substantially proportional to the difference in amplitude of said alternate input signal pulses, comprising the steps of subjecting said input signal to full-wave rectification to provide a second series of pulses of a single polarity, amplifying said second series of pulses, separating and reversing the polarity of alternate pulses of the amplified second series, and combining the separated pulses.

5. In a system for converting an input signal comprising a first series of pulses of alternate polarity and varying amplitude into an output signal whose magnitude is substantially proportional to the difference in amplitude of said alternate input-signal pulses, said system comprising a full-wave rectifier adapted to provide from said first series of pulses a second series of pulses of a single polarity, an amplifier for amplifying said second series of pulses, means for separating and reversing the polarity of alternate pulses of the amplified second series, and means for combining the outputs of said separating and reversing means.

6. In a system according to claim 5 wherein said separating and reversing means comprises an electronic switch.

References Cited in the file of this patent

UNITED STATES PATENTS

| | | |
|---|---|---|
| 2,208,349 | Ulbricht | July 16, 1940 |